United States Patent [19]

Flaig

[11] 4,311,934
[45] Jan. 19, 1982

[54] OFF SET STATOR LAMINATIONS FOR SMALL ROTARY TRANSDUCERS

[75] Inventor: Hans Flaig, Schramberg, Fed. Rep. of Germany

[73] Assignee: Gebruder Junghans GmbH, Schramberg, Fed. Rep. of Germany

[21] Appl. No.: 124,776

[22] Filed: Feb. 26, 1980

[30] Foreign Application Priority Data

Mar. 23, 1979 [DE] Fed. Rep. of Germany ....... 2911439

[51] Int. Cl.³ .............................................. H02K 1/00
[52] U.S. Cl. .................................. 310/216; 310/217; 310/218; 310/49 R
[58] Field of Search ................... 310/46, 49, 216–218, 310/254, 257–259, 156, 187, 188, 191, 193, 194

[56] References Cited

U.S. PATENT DOCUMENTS

| | | | |
|---|---|---|---|
| 507,689 | 10/1893 | Riker | 310/218 X |
| 1,314,132 | 8/1919 | Dorsey | 310/216 X |
| 2,330,824 | 10/1943 | Granfield | 310/217 UX |
| 2,435,911 | 2/1948 | Woude | 310/216 UX |
| 4,214,181 | 7/1980 | Nagahori | 310/156 X |

FOREIGN PATENT DOCUMENTS

| | | | |
|---|---|---|---|
| 1124591 | 6/1962 | Fed. Rep. of Germany | |
| 2528159 | 1/1976 | Fed. Rep. of Germany | 310/49 |
| 2631997 | 1/1978 | Fed. Rep. of Germany | 310/49 |

*Primary Examiner*—Mark O. Budd
*Attorney, Agent, or Firm*—Burns, Doane, Swecker & Mathis

[57] ABSTRACT

An electromagnetic transducer is disclosed which includes a stator, a rotor, and at least one excitation coil winding. The stator includes two substantially geometrically identical stator sections. Each stator section includes an arm having a portion which lies in a plane offset from the plane of the stator. The offset portions of the arms of the stator sections overlap each other to form a magnetic junction for the stator.

4 Claims, 3 Drawing Figures

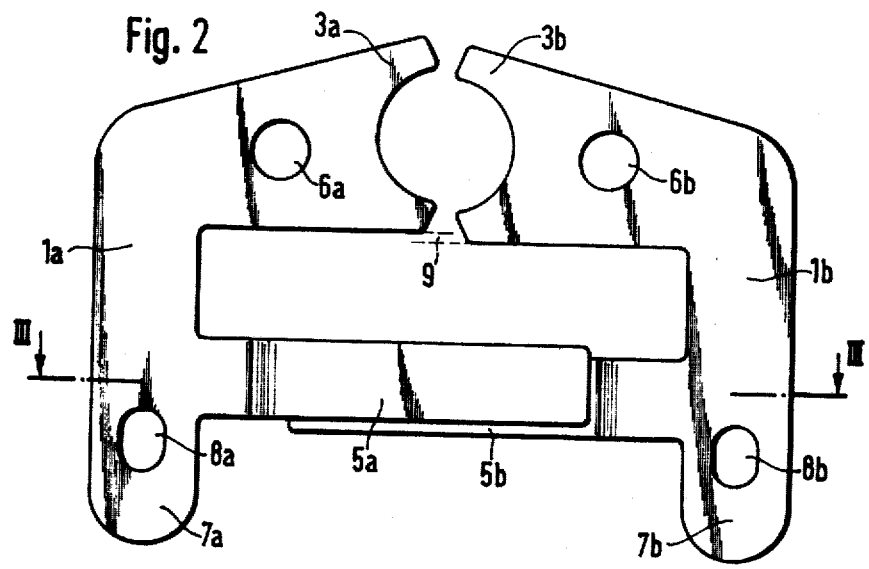
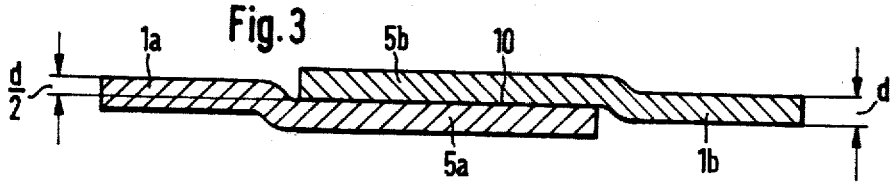
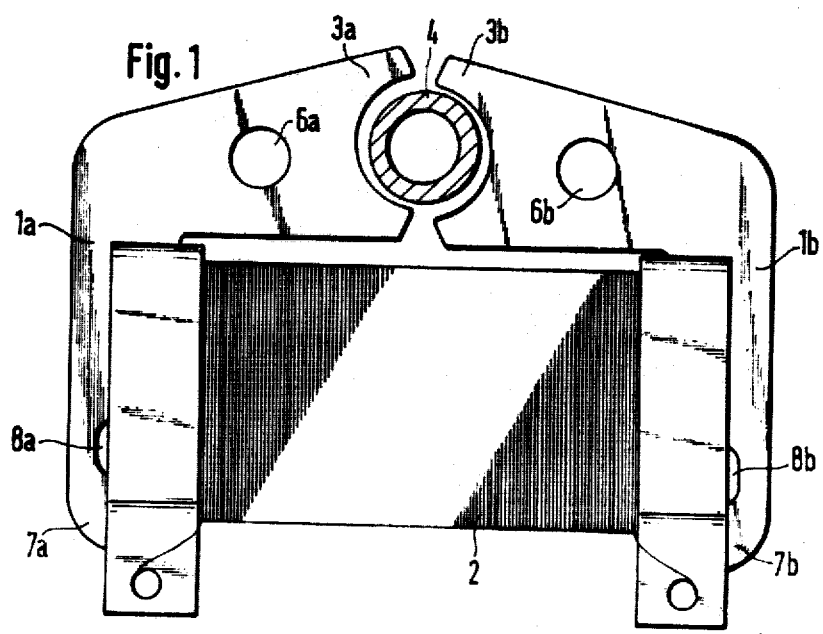

OFF SET STATOR LAMINATIONS FOR SMALL ROTARY TRANSDUCERS

BACKGROUND AND SUMMARY OF THE PRESENT INVENTION

The invention disclosed herein pertains generally to electromagnetic transducers, and more particularly to an electromagnetic transducer for the drive of a quartz crystal controlled electric clock, which drive includes a permanent mangetic rotor and a stator unit having at least one excitation coil.

The stator unit of standard electromagnetic transducers is commonly formed from several differently designed components, which components are used as mounts for the excitation coils and which components may be manipulated in order to adjust the air gap between the stator and the rotor to a desired value. Prior art electromagnetic transducers are known, such as the one disclosed in the published German patent application No. 11 24 591, where the stator unit consists of two dissimilar halves which form a butt-joint in the area of the position of the excitation coil. Such electromagnetic transducers have a relatively high magnetic resistance due to the air gap between the butt-joined components so that the efficiency of such electromagnetic transducers is reduced. Furthermore, the production costs of such electromagnetic transducers are relatively high because of the need to utilize dissimilar components and because of the need for relatively great precision in the manufacture of the stator components in the region of the butt-joint in order to minimize the size of the air gap in this region.

Accordingly, a primary object of the present invention is to provide an electromagnetic transducer for the drive of an electric clock where the stator unit includes relatively few components in order to reduce production costs.

Another object of the present invention is to provide an electromagnetic transducer wherein the magnetic resistance of the stator circuit is relatively low, resulting in a saving of energy and/or an increase in the torque available to the rotor.

An electromagnetic transducer, according to the present invention, includes a stator unit having two, mirror-image stator sections. Each of the stator sections has a generally C-shaped contour, i.e. each of the stator sections includes a central element to which is integrally connected an upper arm and a lower arm. Each of the upper arms of the two stator sections has an end face having a semicircular groove. When the two stator sections are joined together, the semicircular grooves in the upper arms of the stator sections combine to form a generally circular aperture which receives a rotor.

When the stator is assembled, the lower arms of the two stator sections overlap at what is the magnetic junction of the stator. The area of the overlap is relatively large. In the overlap region each of the lower arms of the two stator sections lies in a plane parallel to the plane of the stator, but offset from the plane of the stator by one-half the thickness of the arm. The offset of the lower arm of one stator section is in a direction opposed to the offset of the lower arm of the other stator section. A coil winding is arranged about the lower arms of the two stator section, in the vicinity of the overlap region.

Each of the stator sections also includes a leg or projection which projects from the point of intersection of the central element and the lower arm of the stator section. These projections each include an aperture which aids in the adjusting and fastening of the stator sections.

The present invention is advantageous because the stator unit of the electromagnetic transducer is made up of two identical sections. Because the sections are identical, the cost of manufacture is relatively low, and the process of assembly is relatively simple.

BRIEF DESCRIPTION OF THE DRAWINGS

A preferred embodiment of the present invention is described with reference to the accompanying drawings where like members bear like reference numerals, and wherein:

FIG. 1 is a top view of the preferred embodiment of electromagnetic transducer, according to the present invention, including a stator, a rotor, and a coil winding;

FIG. 2 is a top view of the stator shown in FIG. 1; and

FIG. 3 is a cross-sectional view of the stator shown in FIG. 2, taken on the line III—III of FIG. 2.

DETAILED DESCRIPTION OF THE PREFERRED EMBODIMENT

With reference to FIG. 1, a preferred embodiment of an electromagnetic transducer, according to the present invention, includes a stator unit, which stator unit includes two sections 1a and 1b. The stator sections 1a and 1b are substantially geometrically identical to one another. Each of the stator sections has a generally C-shaped configuration. That is, each of the C-shaped stator sections includes a central section to which is integrally connected an upper arm and a lower arm 3a, 5a (and 3b, 5b).

An end face of each of the upper arms of the two stator sections 1a and 1b includes a semi-circular groove. A portion of the upper arm of each stator section 1a, 1b, located immediately above the semi-circular groove, constitutes one of the magnetic poles 3a, 3b of the stator unit. When the two stator sections are brought together, the semi-circular grooves in the end faces of the upper arms of the stator sections define a generally circular aperture, within which aperture is arranged a multipolar rotor 4, which rotor has permanent magnetic properties. The rotor 4 is thus arranged between the poles 3a and 3b of the stator unit.

When the two stator sections 1a and 1b are brought together, the lower arms 5a and 5b of the two stator sections are brought into overlapping engagement, as is described more fully below. Disposed about these lower arms is an excitation coil 2.

With reference to FIG. 2, the stator unit of the preferred embodiment of the present invention, includes the two geometrically identical magnetizable stator sections 1a and 1b. Each of the two sections includes an upper arm, which upper arm includes one of the magnetic poles 3a and 3b of the stator unit, and a lower arm 5a, 5b. A portion of each of the lower arms 5a, 5b lies in a plane which is parallel to the plane of the stator unit, but which is offset from the plane of the stator unit. When the two stator sections 1a and 1b are brought together, these offset portions of the lower arms 5a, 5b overlap each other. The area of overlap is relatively large.

Each upper arm of the two stator sections 1a, 1b includes a bore 6a, 6b. In addition, each stator section includes a leg or projection 7a, 7b, which projects from the intersection of the central section and lower arm of each stator section, at a right angle to the lower arm. Each of the projections 7a, 7b includes an aperture 8a, 8b which serves to facilitate the fastening and the adjustment of the stator unit.

The upper arm of each of the stator sections includes a segment located immediately below the semi-circular groove in the end face of the upper arm. The space between the corresponding segments of the upper arms defines a gap 9. The two stator sections 1a, 1b may be moved vertically, with respect to one another, across the gap 9, in order to adjust the lines of flux between the poles 3a and 3b for optimal starting conditions for the rotor 4.

With reference to FIG. 3, each of the lower arms 5a, 5b of the two stator sections 1a, 1b includes a portion which lies in a plane which is parallel to the plane of the stator unit but which is offset from the plane of the stator unit by one-half the thickness, d, of the lower arm. These offset portions of the lower arms 5a, 5b overlap each other over an area 10 which is relatively large.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. In an electromagnetic transducer comprising a rotor, a stator, and at least one excitation coil, the improvement wherein said stator comprises only two individual stator sections which are of identical generally C-shape geometry, each stator section including two arms, a first of which defining a magnetic pole for said rotor and a second of which disposed within said coil, said second arms overlapping one another in the direction of the main axis of said coil and being offset from one another in a direction laterally of said coil axis such that said first arms are also offset from one another in said last-named direction.

2. Apparatus in accordance with claim 1 including means for adjusting the relative positions of said stator sections comprising an aperture in each of said stator sections.

3. Apparatus in accordance with claim 1 including means for adjusting the relative positions of said stator sections comprising a projection which projects from each of said stator sections, which projection includes an aperture.

4. Apparatus in accordance with claim 1, wherein said second arms lie in parallel planes which are each displaced from a plane containing the remainder of said stator sections by a distance equal to one-half the thickness of said second arms.

* * * * *